(No Model.)
W. O. NISLEY.
PRACTICE PIANO.
No. 527,504.  Patented Oct. 16, 1894.
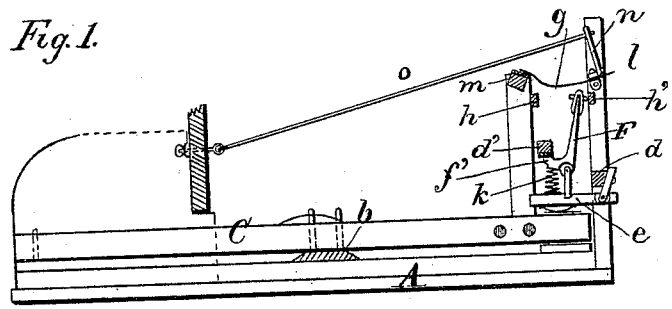
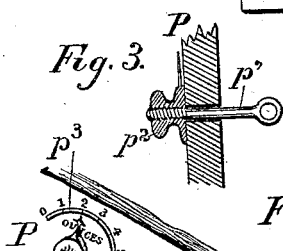
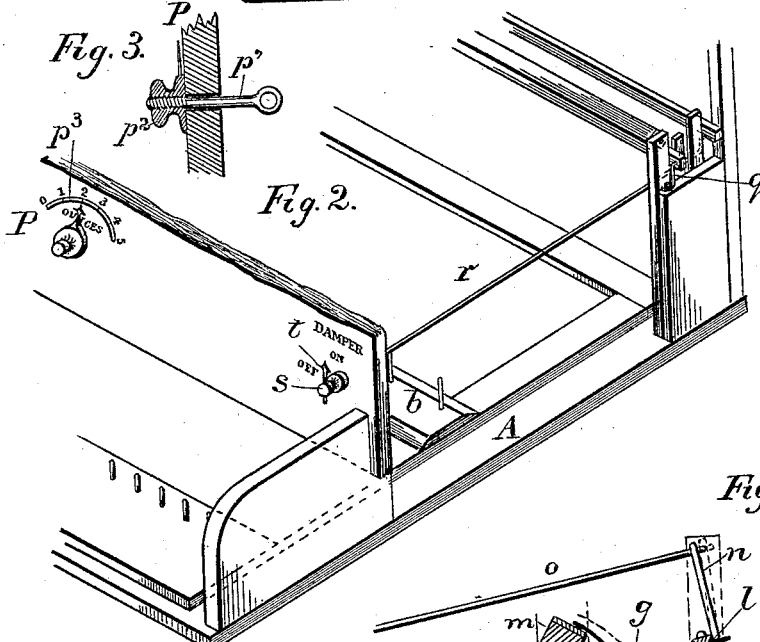
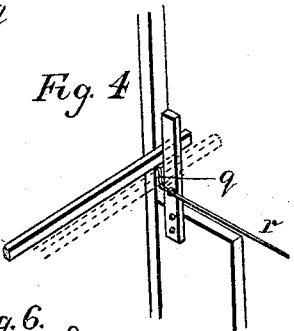
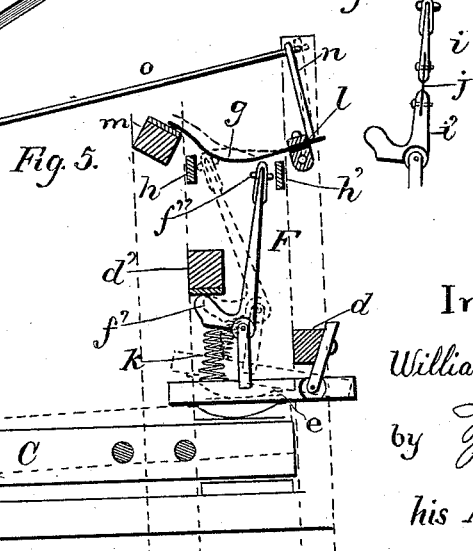
Witnesses:
J. D. Chamberlain
F. J. Safferty
Inventor,
William O. Nisley
by T. J. Geisler
his Attorney.
THE NORRIS PETERS CO., PHOTO-LITHO., WASHINGTON, D. C.

UNITED STATES PATENT OFFICE.

WILLIAM O. NISLEY, OF PORTLAND, OREGON, ASSIGNOR TO THE NISLEY PRACTICE PIANO COMPANY, OF SAME PLACE.

PRACTICE-PIANO.

SPECIFICATION forming part of Letters Patent No. 527,504, dated October 16, 1894.

Application filed January 19, 1893. Serial No. 459,013. (No model.)

*To all whom it may concern:*

Be it known that I, WILLIAM O. NISLEY, a citizen of the United States, residing at Portland, Multnomah county, State of Oregon, have invented a new and useful Practice-Piano, of which the following is a specification, reference being had to the accompanying drawings as a part hereof.

My invention relates to practice pianos or contrivances designed as a substitute for the pianoforte in affording facilities to the student for acquiring technic without the accompanying monotony of playing exercises over and over, audibly, the stroke of the hammer on the string and the action of the damper in stopping the vibration of the string struck after the key has been released being denoted by means of low sounds or clicks. The contrivances heretofore gotten up for this purpose do not, in my opinion, faithfully represent the actual "touch" of a pianoforte, and without this "touch" the student can derive but little benefit from his practice. It is not enough that the student acquire merely agility in his fingers, for that alone does not constitute what is known as "technic;" but he must exercise the muscles and nerves controlling the movements of his fingers so as to get them to be in perfect accord with the operating mechanism of the pianoforte, and to co-operate with such mechanism as perfectly as possible in a mechanical sense in producing the series of sounds or notes constituting a musical composition. It is not enough, therefore, to have merely a series of depressible levers, as substitutes for the keys of a piano, on which to exercise the fingers, but in the operation of each of these levers must be reproduced, as faithfully as possible, the details of the mechanical movements of the real piano action to the extent the same are perceptible to the nerves of the fingers; otherwise the benefits of a practice piano would amount to but little, and the student would derive about as much good from exercising his fingers on a simple table.

With this knowledge in view I have invented the mechanism I am about to describe, the same being illustrated in the accompanying drawings above referred to, the figures in which represent as follows:

Figure 1 is a partial transverse longitudinal section showing the elements of my invention and their combination. Figs. 2, 3, and 4 show the construction and mode of operation of some of the details of my mechanism. Fig. 5 illustrates the action and co-operation of the essential parts of my mechanism constituting the features thereof; and Fig. 6 shows an improvement in one of the parts, viz.: the hammer, of the mechanism last referred to.

Similar letters refer to similar parts throughout the several views.

The frame A. has a bridge $b$, on which is supported a series of keys C similar to those of a piano-forte. Above the rear end of such keys is affixed on a rail $d$, a series of levers $e$, supporting trip-hammers F, these parts operating in imitation of the "piano action," and strike the clicks indicative, as mentioned, of the stroke of the hammers, and the action of the dampers in a piano-forte. The action of said hammers F will be apparent from Fig. 5, and it is my intention by means thereof and its coacting mechanism to reproduce as faithfully as desirable and possible the characteristic features of the hammer-movement or action in a piano-forte. These features will, on observation, be found to be as follows: On starting to press a key down it will move with but little exertion on the muscles of the finger until the jack is about to throw the hammer against the string. Then the finger-muscles must use their greatest exertion, and as soon as the hammer has been thrown the key will move more easily again. The tone is produced when the key has been pressed down about two-thirds of its entire distance. Hence to acquire a correct technic the finger muscles must be trained to exert their depressing force properly to obtain perfect tones, precision and shading. In imitation of the said peculiarities of a piano action the levers $e$ when lifted by the keys, C, cause the trip hammers F, supported thereby to be thrown forward, but in so doing the top of said hammers F is brought in contact with a spring $g$ which it must lift in order to travel to its destination and strike the sound-bar $h$. The contact between said hammers F and springs $g$ as described, simulates the action of the jacks and hammers in a piano forte, and the spring $g$ being rounded downwardly, as soon as the hammers have passed the curve of such spring it is propelled forward by the latter and caused to strike the bar $h$ and produce a slight sound or click before the key has been depressed entirely.

The action of the hammers F may be greatly facilitated by constructing the same as shown in Fig. 6 the shank being in two parts $i$ $i'$ connected by a spring $j$. This form of construction permits such hammers to follow the curve of the springs $g$ more readily in co-operating with such springs as described, and affords the further benefit that the hammers after having struck the bar $h$, and produced the "click" will straighten themselves out again by the action of the spring $j$, causing such hammers to rest in non-contact with the said bars $h$ while their key is being held. Upon releasing the key the spring $k$ will repulse the levers $e$ and while so doing throw the trip-hammers in an opposite direction, against a bar $h'$ to produce a small sound indicative of the damper's action in a piano-forte on the release of a key, as mentioned. $d'$ is a rail for the toe $f'$ of said trip-hammers to operate against.

My keys are weighted to balance the same properly as in a piano-forte.

The tension of the spring $g$ is variable. One of its ends is secured on a movable rail $l$ hung on centers or pivots, and the loose end rests on a fixed rail $m$. The movable rail $l$ has an arm $n$ connected by means of a rod $o$ with a device $p$, consisting of a screw bolt $p'$ and nut or threaded knob $p^2$ provided with an indicator $p^3$ adapted to work on a registering dial as seen in Fig. 2, the several parts being so arranged that by turning the hand or indicator $p^3$ to a certain point on said dial the springs $g$ will be given a certain tension, which regulates the action of my practice piano making it light or heavy according to the requirements of the student.

The sound-bar $h$ $h'$ may be stationary, or set on cranks, $q$, or equivalent devices allowing them to be raised and lowered in slots as shown in Figs. 2 and 4 by a crank-rod $r$ having a knob $s$ and hand $t$ to indicate the position of such bars $h$, $h'$, that is to say whether in position to be struck by the hammers F or not.

The bars $h$ $h'$ operate independently so that both the action of the hammers and dampers in a piano-forte, or either of such actions can be indicated as mentioned.

The several parts should be provided with suitable bushings so as to render the action noiseless; and the hammer-heads $f''$ should also be provided with little metallic-pegs to produce a clearer sound or click when striking the bars $h$ $h'$ which should be of hard wood or metal.

Having thus fully described my invention, I claim and desire to secure by Letters Patent, as follows:

1. In a practice piano, the combination with suitable keys of levers as $e$ pivotally supported on the frame and co-operating with such keys, and which levers carry trip-hammers as F; springs as $k$; a stop or rail as $d'$; and springs as $g$, suitably supported and adapted to co-operate with such trip-hammers as described.

2. In a practice piano, the combination with suitable keys of levers as $e$ pivotally supported on the frame and co-operating with such keys, and which levers carry trip-hammers as F; sounding contrivances for the heads of the trip-hammers to strike against for the purposes specified; springs as $k$; a stop or rail as $d'$; and springs as $g$, suitably supported and adapted to co-operate with said trip-hammers as described.

3. In a practice-piano, the combination with suitable keys of levers as $e$ pivotally supported on the frame and co-operating with such keys, and which levers carry trip-hammers as F springs as $k$; a stop or rail as $d'$; springs as $g$, suitably supported and adapted to co-operate with such trip-hammers; and means for adjusting said springs $g$ so as to increase or diminish their tension, as described.

4. In a practice-piano, a trip-hammer the shank of which is composed of two parts connected by a spring, substantially as and for the purposes set forth.

5. The combination in a practice-piano of bars as $h$ $h'$ for the hammers to strike against said bars being adapted to be thrown in front of the hammers and removed again for the purposes specified, bearings for said bars to operate in and means for operating the same, substantially as set forth.

In testimony whereof I have hereunto affixed my signature in the presence of two witnesses.

WILLIAM O. NISLEY.

Witnesses:
   F. D. CHAMBERLAIN,
   T. J. GEISLER.